UNITED STATES PATENT OFFICE.

NOAK VICTOR HYBINETTE, OF WESTFIELD, NEW JERSEY.

PROCESS FOR REFINING COPPER-NICKEL MATTE.

No. 805,555.

Specification of Letters Patent.

Patented Nov. 28, 1905.

Application filed November 25, 1904. Serial No. 234,160.

*To all whom it may concern:*

Be it known that I, NOAK VICTOR HYBINETTE, a citizen of the United States of America, and a resident of Westfield, county of Union, and State of New Jersey, have invented certain new and useful Improvements in Processes for Refining Copper-Nickel Matte, of which the following is a specification.

The raw material for my process is a copper-nickel sulfid produced by roasting and smelting of ordinary copper-nickel ores. This raw material, generally called "concentrated matte," contains about twenty-five per cent. sulfur and one-half per cent. to five per cent. iron, the remainder being copper and nickel in differing proportions, generally about thirty-five to forty per cent. of each metal.

The first step in my process is now to grind and roast the matte. The roasted material is leached with sulfuric acid until the material will no longer neutralize the acid. This step in my process is not new in itself and is well-known to those conversant with the metallurgy of nickel. I prefer to grind the matte to a size passing through a screen with thirty meshes to the inch. The roasting is started at a low temperature and gradually increased until the sulfur contents are brought down to about one per cent. More or less copper and nickel will be changed into sulfates; but such sulfur as is present as sulfates is not detrimental; but after the material is leached with water there may still be allowed to remain about one per cent. sulfur. When the material is being leached with sulfuric acid, I take the precaution to use only dilute acid, so that the amount of free acid in my solution will at no time be more than five to ten per cent. In this way it is possible to remove the bulk of the copper without at the same time dissolving much nickel. My solution will contain one part nickel to about ten parts of copper. If I do the leaching with stronger acid, the proportion of nickel will be greater. The solution so prepared is crystallized and boiled down and again crystallized, and at each repeated crystallization I receive crystals of commercially pure copper sulfate. The mother-liquor from such crystallization contains copper and nickel in about equal parts. I concentrate it and boil it down to a solid mass of copper-nickel sulfates. The material that has been leached contains about fifty-five to sixty per cent. nickel and twelve to eighteen per cent. copper and is subjected to the second operation in my process. I mix the material with sulfuric acid of about sixty per cent. free acid in such quantity that there will be sufficient acid to form sulfate of copper with all the copper that is present. The mass is then slowly brought up to a low red heat and roasted at that temperature for a short time. The reaction that takes place is that the free acid becomes combined with copper and nickel to sulfates of these metals; but sulfate of copper is preferably formed. When the material reaches a temperature of about 800° centigrade, the sulfates begin to decompose; but the sulfate of copper is not affected in the same way as the sulfate of nickel, and the consequence is that when the sulfates are completely decomposed, or nearly so, and the material drawn from the furnace and leached with weak sulfuric acid I again obtain a solution with about ten parts of copper to one part of nickel and which upon crystallization will yield commercially pure sulfate of copper. The mother-liquor from this second leaching is of the same nature as that above referred to and is boiled down, giving more salts of about equal parts of copper and nickel. This heating with sulfuric acid may be repeated, and after one or more such treatments I have a residue after leaching which contains about seventy per cent. nickel and three to five per cent. copper. The next step in my process is to mix this residue with hydrochloric acid or a mixture of common salt or chlorid of sodium and sulfuric acid. The material is again heated to a low red heat, and chlorids of nickel and copper are formed. As, however, chlorid of nickel is far more readily decomposed by heat than chlorid of copper, I can continue my roasting operation to a point where a maximum of copper and a maximum of nickel are present as chlorids. I then draw the material from the furnace and leach it with water and weak acid, whereby I obtain a residue of practically pure nickel oxid with about one-half per cent. copper still present. The treatment with hydrochloric acid may be repeated, in which case a still more pure nickel oxid is obtained, assaying about seventy-seven per cent. nickel and one-tenth per cent. copper. This chloridizing roasting of nickel oxid for the sake of removing small percentages of copper is not unlike the ordinary Henderson process for the extraction of copper from ores and is well known to those conversant with metallurgy of nickel. The reactions that take place in my sulfuric-acid process are probably not corresponding to or congruent with those of the chloridizing roasting. In the latter case chlorid of nickel is first formed and is decomposed as the roasting goes on, and more and more chlorid of copper is formed at the same time. By careful roasting copper can be extracted in this way down to mere traces. In the sulfuric-acid treatment there is no decomposition of nickel sulfate with simultaneous formation of copper sulfate. In the leaching of the mixed oxids with weak sulfuric acid the copper is dissolved as long as the oxid of nickel in the mixed oxids is not in such excess as to protect the oxid of copper from the action of the acid. This point is reached when the copper percentage is down to twelve to fifteen per cent. It is lower the more copper was contained in the original material and the lower the temperature of roasting. After this point no separation of copper by leaching is possible, and such material has heretofore been handled in the very expensive way of completely dissolving the whole mass in hydrochloric acid and precipitating the metals separately from such solution. I have now found that if the material is heated in a furnace with concentrated sulfuric acid large quantities of both copper and nickel form sulfates, but always so that a greater proportion of copper than nickel is made soluble. This proportion is more favorable the higher the copper contents are in the material. If, therefore, the percentage of copper is as high as, say, eighteen per cent., I can draw the material from the furnace at a point below red heat, where only the free acid is driven off, and the solution with water will then contain copper and nickel in about equal quantities. When, however, the copper is down to twelve per cent. or below, I find that an undue proportion of nickel is made soluble, and I do therefore raise the heat to a point where all or nearly all nickel sulfate is decomposed. At this point the copper is also made insoluble in water, but not in the same way as the nickel, because it is again made soluble by very weak acid, and the solution so obtained contains very little nickel. I have no theoretical explanation to offer for this process; but it is a fact that each time the material is heated with sulfuric acid I can afterward extract a portion of the copper with acid so weak that it would have no influence on the material before said heating. This nickel oxid is refined to metallic nickel in one of the several ways now in use and well known to those conversant with the art. Preferably I may smelt the oxid to metallic nickel anodes containing about ninety-five per cent. nickel. Such anodes are suitable for refining by ordinary electrolytic processes. This last leaching of chlorids leaves a solution from which no pure salts can be separated. It contains nickel and copper in about equal parts.

Each one of the three steps in my process has left a solution of mixed copper and nickel salts. I prefer to heat these salts to a strong red heat, whereby all the nickel sulfate and chlorid are changed in oxid. This residue is leached with water and weak sulfuric acid, whereby copper sulfate is again obtained, and the residue from the leaching is nickel oxid of about the same purity as that produced by the regular process.

It is evident that instead of heating with acid I may use its chemical equivalent, such as sodium bisulfate, which upon heating will give off sulfuric acid, and instead of using hydrochloric acid I may use sodium bisulfate and sodium chlorid, which upon heating will produce hydrochloric acid.

The treatment which I have called the "second step" is naturally more expensive than the first, and there is no call for its use until the copper contents are reduced to about twelve per cent., at which point the operation called the "first step" refuses to work satisfactorily. This second step gives less favorable results the lower the copper contents are and has to be substituted by the treatment with hydrochloric acid when the percentage of copper is brought down to five to three per cent. This third step is not practical when the copper contents are above three to five per cent.; but by combining the three steps I can successfully treat all grades of material.

I do not intend to make any claim to the first and third steps in themselves. They have long been known to be well suitable for the separation of copper; but as the first step becomes impractical when the copper contents have been brought down to twelve per cent. and the third step cannot very well be used until the copper is as low as three to five per cent. it has been impossible to combine the two in a practical process. I have now invented the process of separating copper from nickel by heating with sulfuric acid and leaching with weak acid, a process which is well suited to handle the material after the first step is no longer useful and leave a product which can be conveniently treated by chloridizing roasting.

There are many electrolytic copper-refineries which treat nickel-bearing copper. These factories made as a by-product a mixed sulfate of about equal portions of nickel and copper. With former processes this salt has to go through a long and expensive separating process; but according to my invention these salts may be handled as the mother-liquor from crystallization of sulfate of copper, as herein described.

What I claim as my invention is—

1. The process of separating copper from nickel in copper-nickel matte, consisting in first roasting the matte to oxids, then leaching with weak sulfuric acid, thereby extracting principally sulfate of copper, then heating with sulfuric acid at least to a temperature where hydrous sulfates do not exist, leaching with weak sulfuric acid, thereby extracting principally sulfate of copper, then heating with hydrochloric acid to a temperature enough for partial decomposition of the anhydrous chlorids, leaching with weak acid and repeating the said heatings when necessary thereby obtaining a nickel oxid, suitable for refining by ordinary means.

2. The process of separating oxids of copper and nickel by heating with sulfuric acid at least to a temperature where hydrous sulfates do not exist, leaching with weak sulfuric acid, thereby extracting principally sulfate of copper, then heating with hydrochloric acid to a temperature high enough for partial decomposition of the anhydrous chlorids, leaching with weak acid and repeating the said heatings when necessary thereby obtaining a nickel oxid, suitable for refining by ordinary means.

3. In the process of separating oxids by heating with sulfuric acid and leaching with weak acid, the method of heating the material to at least partial decomposition of the anhydrous sulfates and leaching with weak acid, thereby extracting copper oxid formed in said decomposition without extracting the nickel oxid formed at the same time.

Signed at New York this 22d day of November, 1904.

NOAK VICTOR HYBINETTE.

Witnesses:
C. SEDGWICK,
J. M. HOWARD.